United States Patent [19]

Tachibana et al.

[11] 4,375,900

[45] Mar. 8, 1983

[54] CONTROL SYSTEM OF AND DEVICE FOR MEMORIZING, READING AND REPRODUCING THE POSITION OF MATERIAL TO BE CONTROLLED

[75] Inventors: Akifumi Tachibana, Goshonouchi; Minoru Watanabe, Shinnaka; Takanori Shigihara, Hyogo, all of Japan

[73] Assignee: Kabushiki Kaisha Morita Seisakusho, Kyoto, Japan

[21] Appl. No.: 172,428

[22] Filed: Jul. 25, 1980

[30] Foreign Application Priority Data

Aug. 1, 1979 [JP] Japan ................................ 54-98793

[51] Int. Cl.³ .............................................. A47C 3/20
[52] U.S. Cl. .................................... 297/330; 248/421;
 297/354; 297/361; 364/174; 367/118
[58] Field of Search ............... 297/330, 337, 342, 347,
 297/354, 361, 362; 248/157, 421, 422; 364/174;
 367/118, 117, 127, 96

[56] References Cited

U.S. PATENT DOCUMENTS 3,866,973 2/1975 Heubeck .......................... 297/354 X
4,264,849 4/1981 Fleischer et al. .................... 297/330
4,278,290 7/1981 Werner et al. ...................... 297/362
4,280,205 7/1981 Dammeyer ...................... 367/127 X

FOREIGN PATENT DOCUMENTS 2736276 11/1978 Fed. Rep. of Germany ...... 297/330

Primary Examiner—William E. Lyddane
Attorney, Agent, or Firm—Koda and Androlia

[57] ABSTRACT

This disclosure relates to a control device of transmitting an ultrasonic pulse from an ultrasonic transmitter to an ultrasonic receiver by disposing the transmitter and the receiver between two movable members which are placed in a variable relation in linear distance with each other, converting aerial propagation time of the pulse from the transmitter to the receiver into an electrical means, memorizing and holding a distance between the two members by the electrical means, and reading the memorized distance at any desired time and reproducing the distance. The disclosure also relates to a control device using the system.

8 Claims, 10 Drawing Figures

CONTROL SYSTEM OF AND DEVICE FOR MEMORIZING, READING AND REPRODUCING THE POSITION OF MATERIAL TO BE CONTROLLED

BACKGROUND OF THE INVENTION

1. Field of the Invention

This invention relates to a control system of electrically memorizing the distance between a first and a second member which are in a relative distance variable relation with each other on a straight line, reading the memorized distance between the two members, when necessary, and reproducing the distance between the two members at any time; and to a control device for memorizing and reading the reproducing the position of a stool or a chair such as used with dentists, physicians, barbers, beauty specialists and the like.

2. Prior Art

Heretofore, this kind of control system of or device for reading and reproducing the memory which has been used is of the system or device in which a position detection device including a potentiometer is brought into interlocking with a material to be controlled in response to the position of the material, the position of the material is read in terms of a resistance value of the potentiometer and thereafter the resistance value is memorized as a resistance value by another motor-interlocking potentiometer provided through a contact relay (for example, Japanese patent publication No. 151291/1977). But according to this system, it is not only inevitable to provide a mechanically interlocking mechanism between a position detection potentiometer and a material to be controlled and difficult to mount a position detection device but also the potentiometer is in an interlocking relation with the material to controlled, and accordingly, when the material is moved, the resistor and a slider cause wear by slide contact between them irrespective of manual or automatic operation, with the result that the resistance value detected is reduced in relability and in addition thereto, the mechanical error of the interlocking mechanism in combination with the reduced reliability further reduce reliability. To eradicate this vicious cycle, it is necessary to use the position detection potentiometer in a non-heating area and this in turn makes it necessary to use a highly reliable and expensive potentiometer. This interlocking mechanism must also be accurate, which in turn added to production cost. This is a disadvantage. Also, when the memorized position of the material is reproduced and controlled by comparing the resistance value of the motor interlocking potentiometer with that of the position detection potentiometer provided through the contact of a relay or the like. Accordingly, in the above-described control system of memorizing, reading and reproducing, a position of a material to be controlled, a control circuit for position detection and memory, position reading, etc. is of complicated structure including a relay and the like, and wear of the contact of the relay reduces the reliability of reproducibility in the system. This is another disadvantage. This invention has been accomplished to obviate the disadvantages of the conventional control system of memorizing, reading and producing a position of a material to be controlled and has a very wide range of application.

SUMMARY OF THE INVENTION

The system of the invention provides a system of transmitting the ultrasonic pulse between the first and the second member which are in a relative distance variable relation with each other on a straight line, detecting the distance between the members in terms of the time constant of another set pulse on the basis of the propagation time detected, reading the memorized distance as occasion demands and reproducing and controlling the members at any time to the memorized distance.

DETAILED DESCRIPTION OF THE INVENTION

Figure 1:
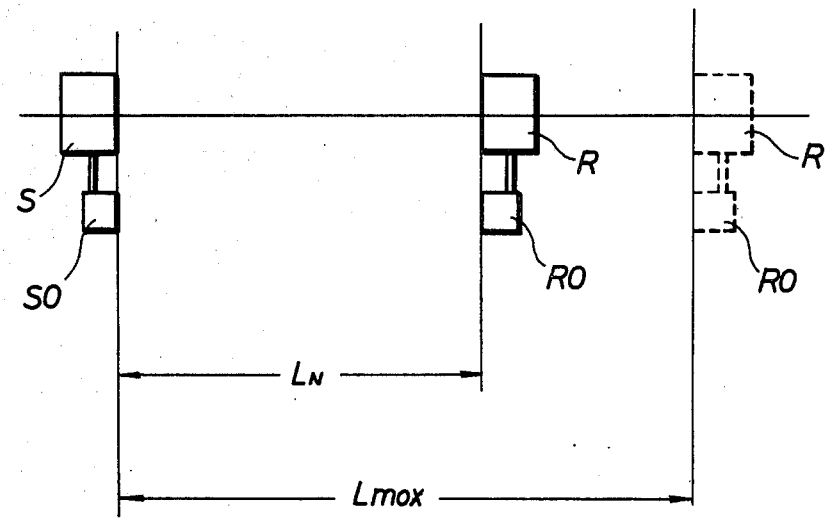
FIG. 1 shows the principle diagram of the control system of memory, reading and reproduction according to the invention system.

A description will now be given of a basic principle of this invention system. FIG. 1 shows one aspect of the basic principle of this invention system, according to which an ultrasonic transmitter SO and an ultrasonic receiver RO (hereinafter referred to as a transmitter SO and receiver RO) respectively for transmitting and receiving an ultrasonic pulse are attached to a second member R whose movement is controlled within the straight area of control in which a maximum separation distance Lmax from a first member S is determined, and control of the distance in the straight area of control is made by transmission and reception of an ultrasonic pulse respectively by the transmitter SO and the receiver RO. According to this system, the distance LN between the first member S and the second member R is detected in terms of propagation time of the ultrasonic pulse transmitter between the transmitter SO and the receiver RO attached to the first member and the second member. Accordingly, supposing in FIG. 1 that an ultrasonic pulse is periodically and intermittently sent forth from the transmitter SO and that the pulse set forth is received by the receiver RO attached to the second member R which is disposed in an opposed relation with the transmitter SO (hereinafter referred to as a received pulse), it will readily be conceivable that the distance LN between the first member S and the second member R can be detected by grasping the period of time during which the ultrasonic pulse propagate through the distance LN between the transmitter SO and receiver RO. Accordingly, a memory set pulse lagging in time and different from the above received pulse is generated in synchronism with the time of sending forth of the ultrasonic pulse from the transmitter SO, and the distance LN between the first member S and the second member R can be grasped in terms of the time in which the memory set pulse lags behind the time when the ultrasonic pulse was sent forth (hereinafter referred to as time constant of memory set pulse). According to the system of the invention, the oscillation period of the ultrasonic pulse is fixed at a time longer than the time necessary for the ultrasonic pulse to propagate through a maximum separation distance between the first member S and the second member R. The reason is that each time the ultrasonic pulse which the transmitter SO periodically and intermittently sends forth is received by the receiver RO, a time difference between the time when the ultrasonic pulse is given forth by the transmitter SO and the time when it is received by the receiver RO is successively compared with the time constant of memory set pulse, and the time constant of set pulse is changed accordingly until the time difference and the time constant are brought into agreement, and when they both are in agreement, the distance LN between the first member S and the second member R is converted into the time constant of memory set pulse and memorized. Also, the principle of reading and reproduction and control according to the system of the invention is to read that distance LN between the members S and R which was converted into the time constant of memory set pulse and was fixedly memorized through the memory set pulse generated in response to the ultrasonic pulse periodically and intermittently sent forth by the transmitter SO and simultaneously, to read the distance LN' between the two members S and R through the received pulse, to move the distance LN' between the members S and R until the received pulse and the memory set pulse are in agreement and to reproduce and control the distance.

Figure 2:
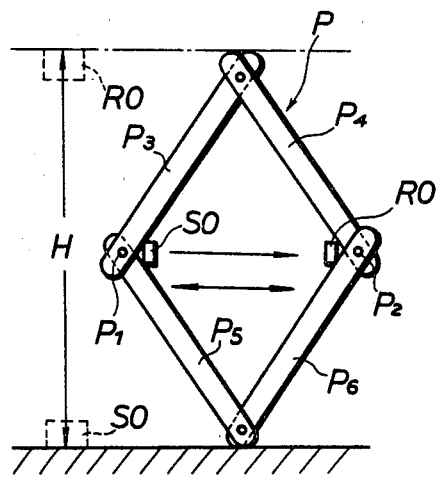
FIG. 2 shows the principle diagram of another embodiment of the invention system.

In FIG. 1, the transmitter SO and the receiver RO are shown directly disposed between the first member S and the second member R, while in the principle diagram illustrating another embodiment shown in FIG. 2, the transmitter and the receiver are shown indirectly disposed between the first member S and the second member R. Namely, in the movement elevatable by a pantagraph mechanism P in FIG. 2 when it is desired to control height H, it is only necessary to oppose the transmitter and receiver in an opposed relation on a straight line in the dotted line position. But if it is difficult to position the transmitter and receiver in the relation described above for some reason or other, it is possible to control the height H in terms of the distance between the transmitter and receiver by disposing the transmitter SO in an opposed relation with the receiver RO on a horizontal line between elevatably expansible links P3, P5 and P4, P6, as shown in FIG. 2. The principle of reproduction and control of distance in the embodiment illustrated is to memorize the distance between the first and second members and to read and reproduce and control the memorized distance at any time in the same manner as described with reference to FIG. 1. Also, the ultrasonic transmitter and receiver used in this invention are described in detail in the United States patent application Ser. No. 165,385 filed in July 3, 1980 by the present applicant and hence only the gist of the application is described below to avoid repetition.

(a) The ultrasonic transmitter is least affected by noise because the transmitter sends forth an ultrasonic pulse small in angle of direction.

(b) Standing waves are least likely to occur because the transmitter sends forth an ultrasonic pulse corresponding to an ultrasonic driving pulse and excellent in damping characteristic.

(c) Because a piezoelectric element high in mechanical Q is used in the receiver having the same structure as the transmitter, the receiver is insensitive to a frequency other than a limited frequency and is hard of sensing trembling air, vibration from fitting surfaces, or natural convection and the like in the form of external noise.

Figure 3:
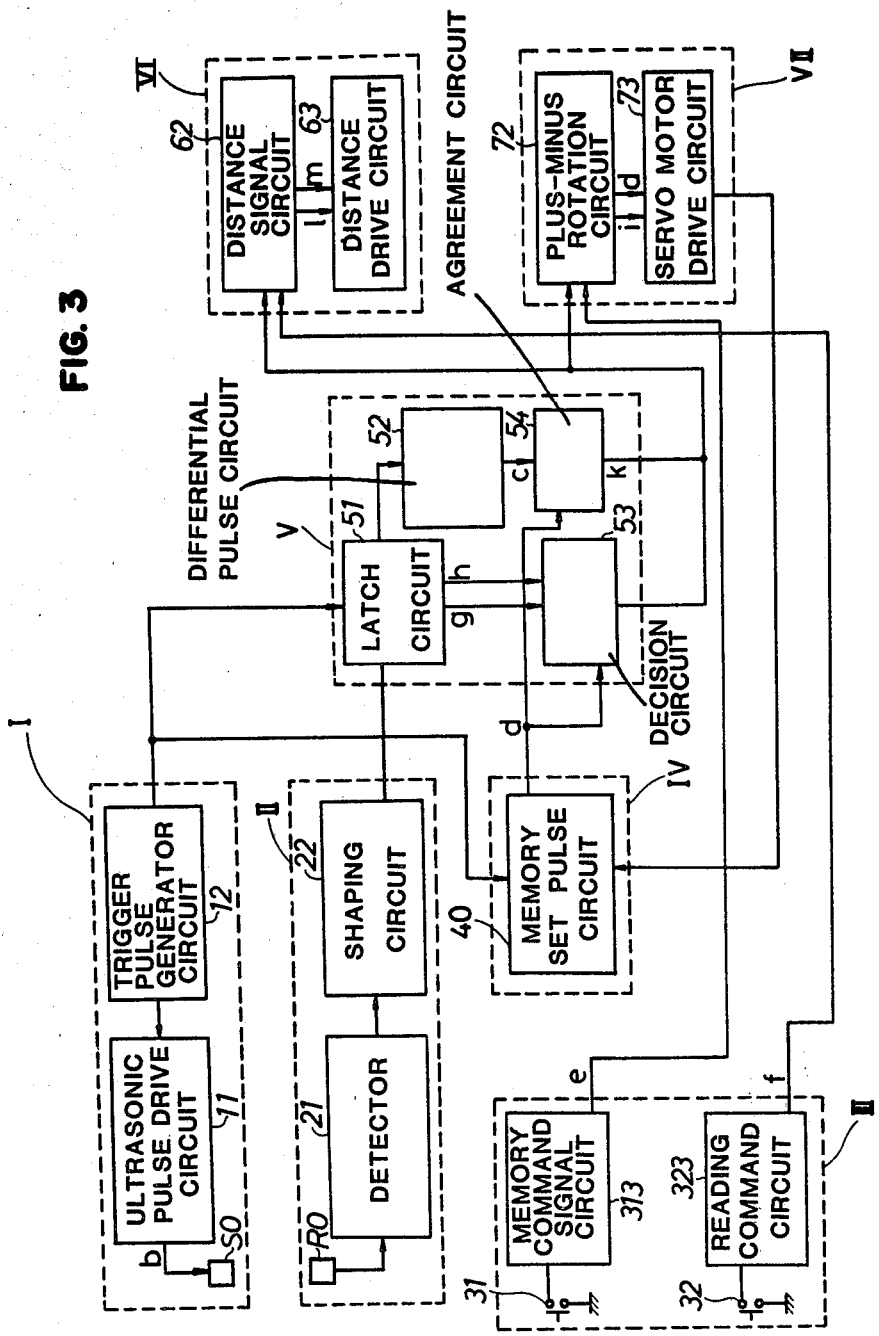
FIG. 3 shows a block diagram for practicing the control system of memory and reproducing according to the invention.
Figure 4:
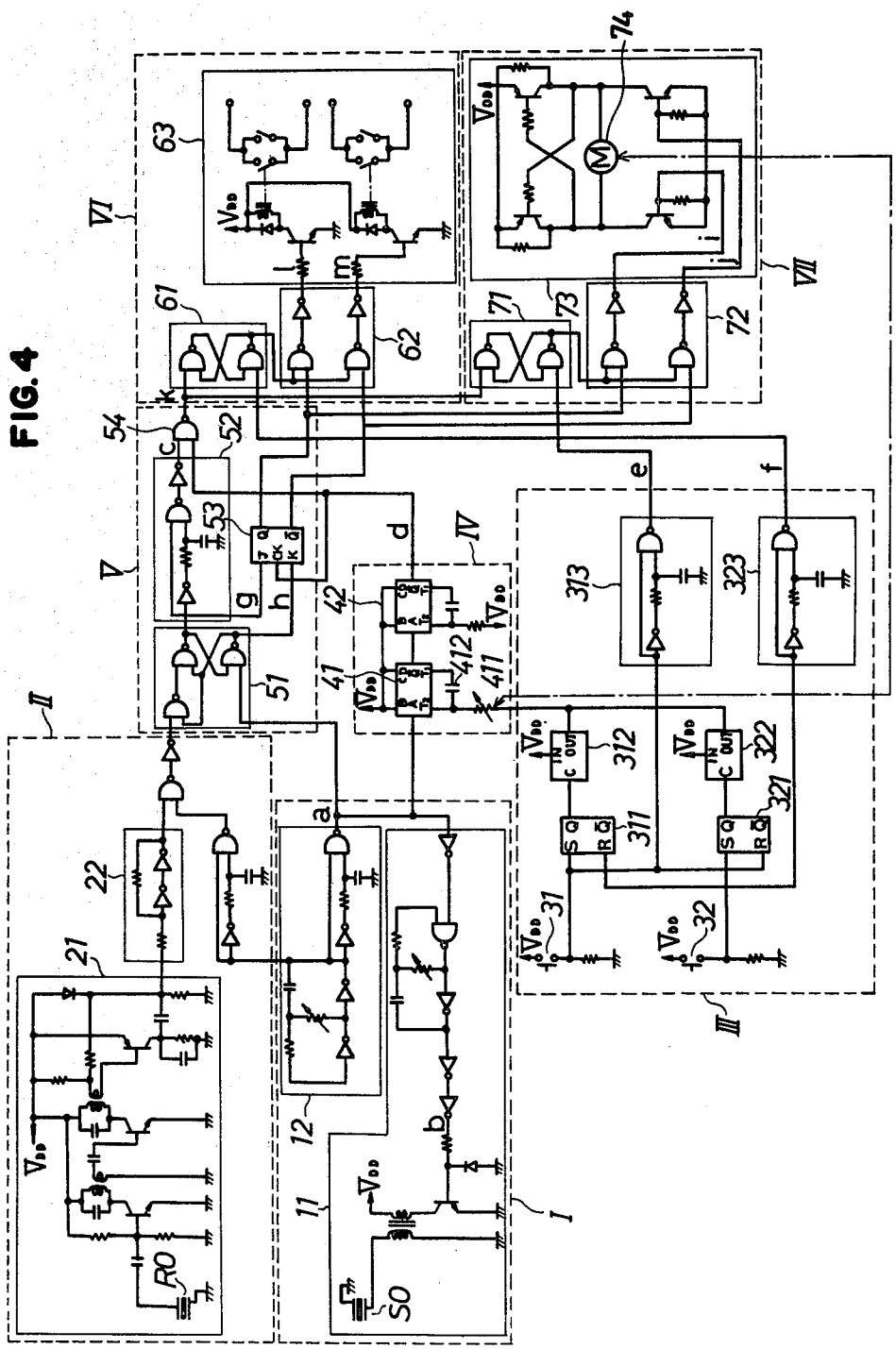
FIG. 4 is an electric circuit corresponding to FIG. 3.
Figure 5:
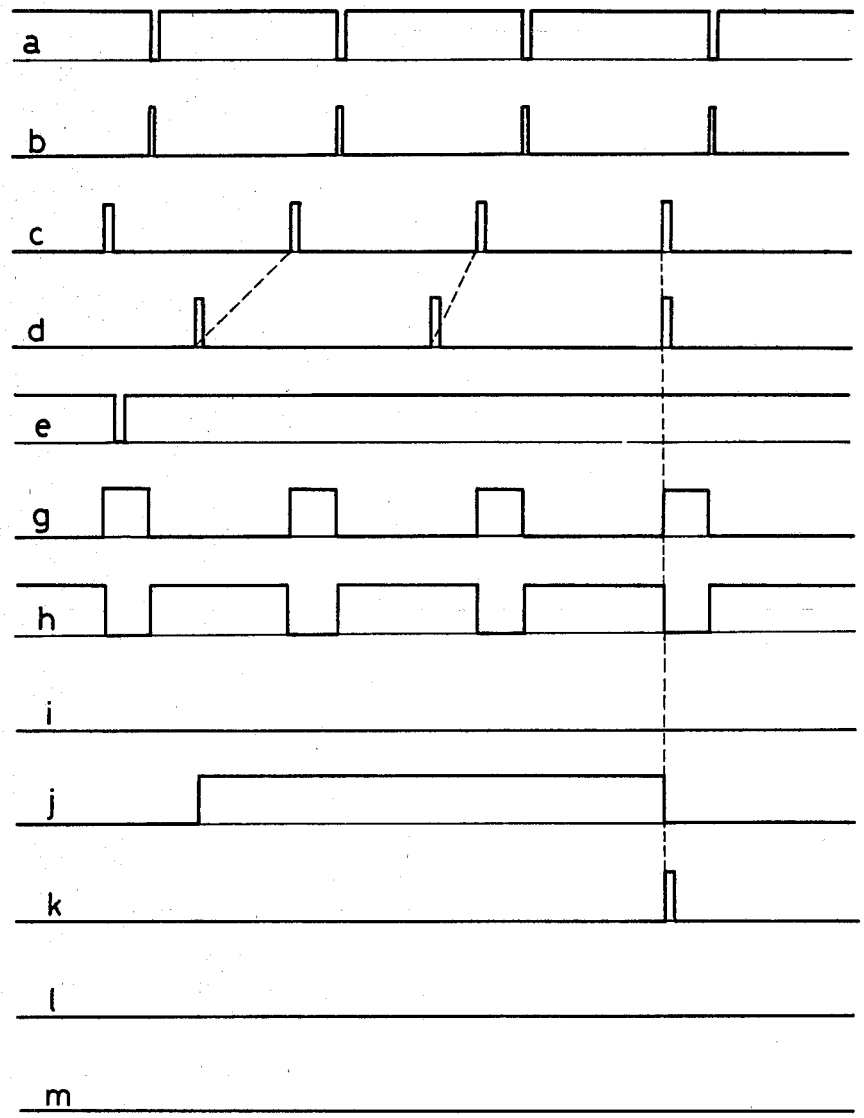
FIGS. 5, 6, 7 and 8 are time charts respectively of FIG. 4.
Figure 6:
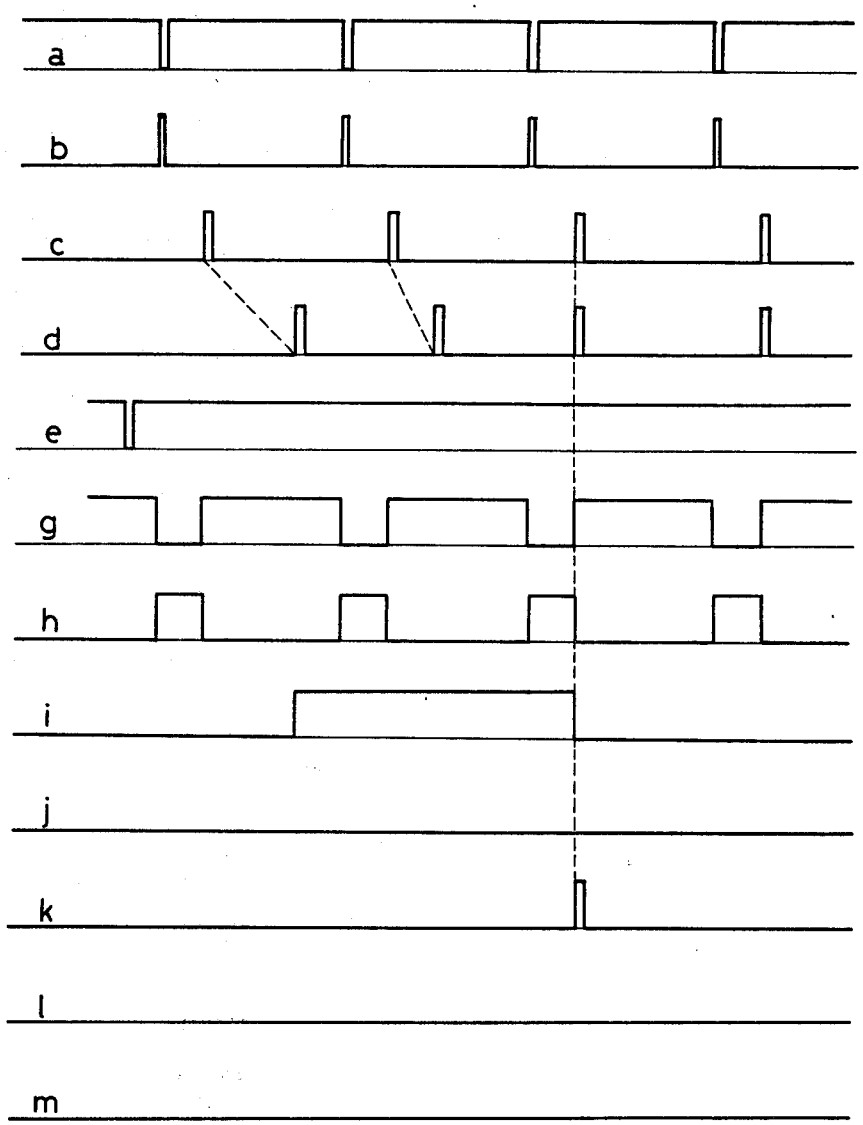
Figure 7:
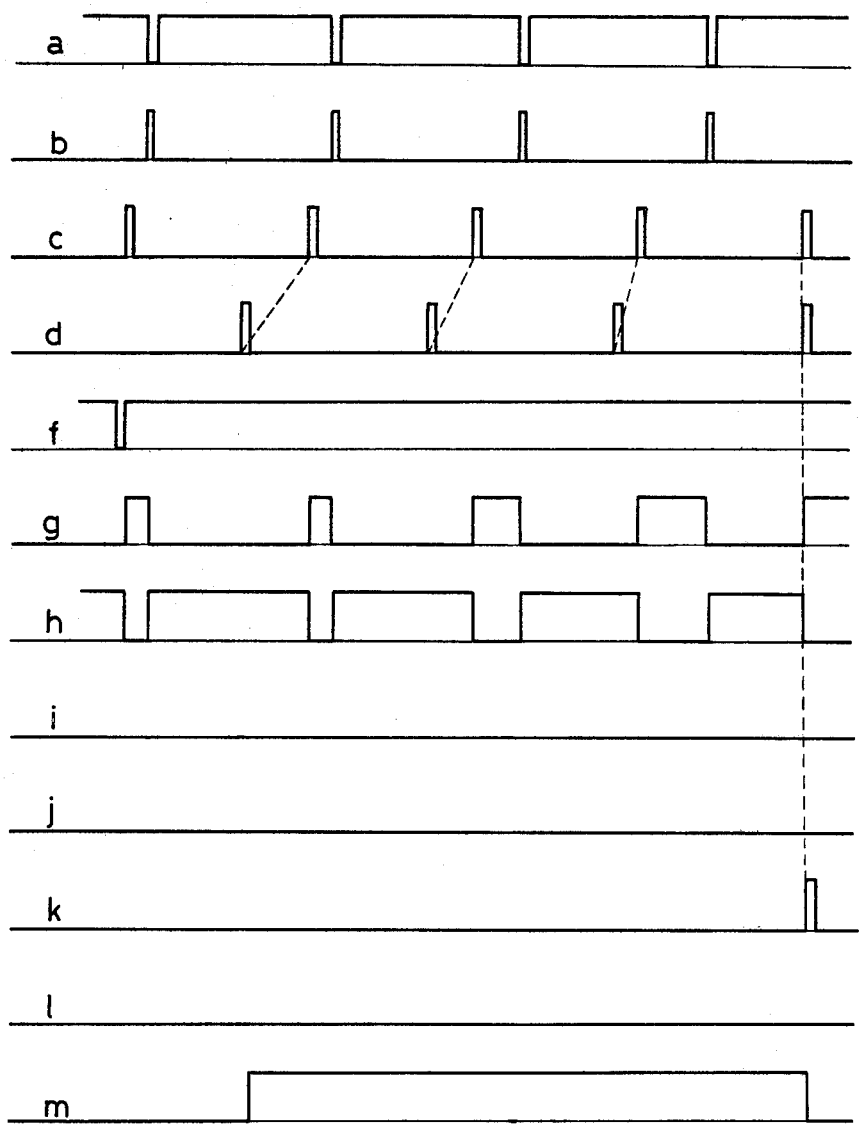
Figure 8:
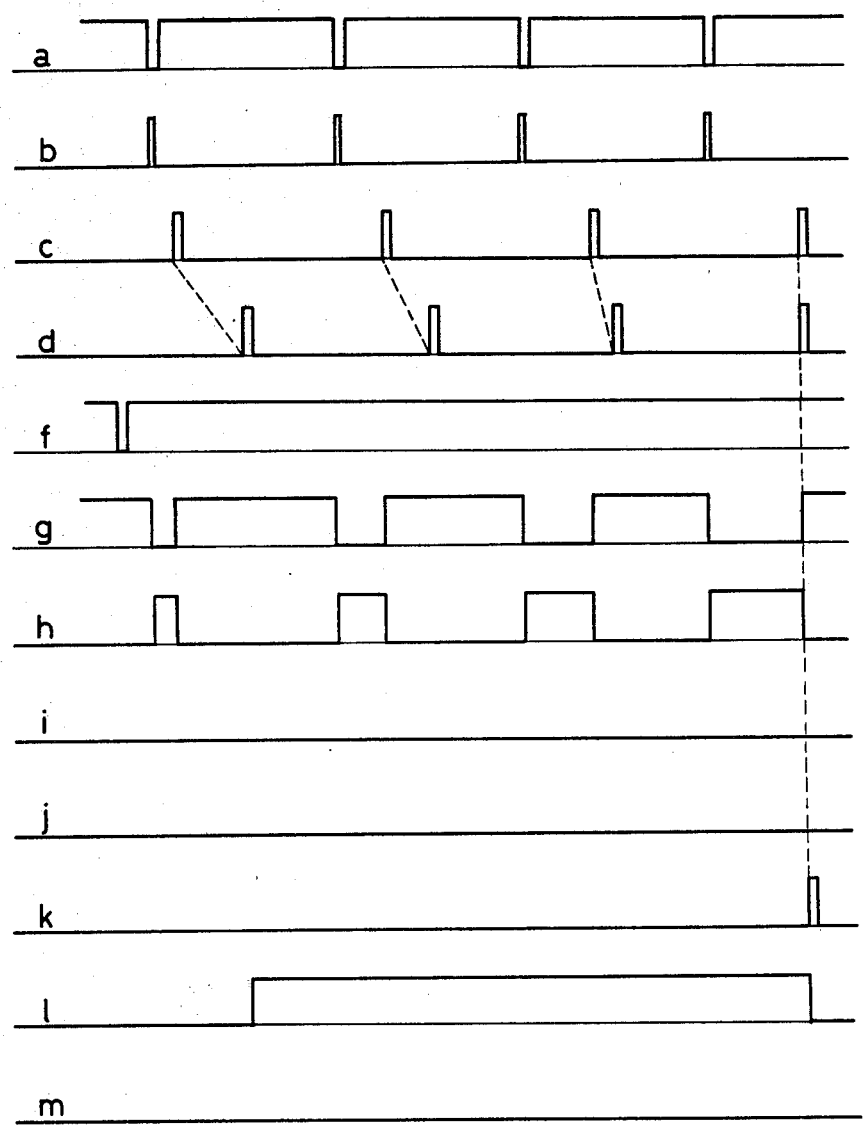

Since it will have been fully understood from the above description how the basic principle of the invention system works, a detailed description will now be given of the memorizing principle of and the reading and reproducing principle of the invention system with reference to a preferred embodiment of the invention. FIG. 3 is a block diagram for practicing the invention; FIG. 4 is an electric circuit diagram according to the block diagram of FIG. 3, and FIGS. 5 through 8 are time charts corresponding to FIG. 4. In FIG. 3, the electric circuitry for practicing the invention comprises an ultrasonic pulse generation unit I, a received pulse generation unit II, a control command circuit unit III, a memory set pulse generation unit IV, a comparison circuit V, a drive circuit unit VI, and a memory set pulse control unit VII. Referring schematically to the operating principle of these circuits, the ultrasonic pulse generation unit I makes switching control of an ultrasonic pulse drive circuit 11 by a trigger pulse in FIG. 5a generated from a synchronous trigger pulse generation circuit 12, excited the circuit 11, generates a driving pulse as shown in FIG. 5b and applies the driving pulse to a transmitter SO to thereby send forth an ultrasonic pulse from the transmitter. The ultrasonic pulse sent forth in the manner described above is received by the receiver RO inside the received pulse generation unit II. The ultrasonic pulse received by the receiver RO is amplified, detected and shaped in waveform by an ultrasonic received pulse amplification detection circuit 21 and waveform shaping circuit 22, and inputted into a latch circuit 51 inside the comparison circuit unit V in the form of a received pulse. The control command circuit unit III generates a command signal as shown in FIG. 5e from a memory command signal generation circuit 313 by operation of a memory command switch 31 and at the same time brings the output Q of R—S F/F 311 up to an H-level to thereby bring an analog switch into a low resistance state in which a motor interlocking potentiometer 411 is supplied with supply power VDD. Also, a command signal as shown in FIG. 7f is generated from a reading command circuit 323 by operating a reading command switch 32 and at the same time the output Q is brought up to an H-level to thereby bring an analog switch 322 into a low resistance state in wh which the motor interlocking potentiometer 411 is supplied with supply power VDD. According to the embodiment, R—S F/F 311, 321 and analog switches 312 and 322 are constructed not to operate at the same time, but the memory set pulse generation unit IV, when a trigger pulse (FIG. 5a) is inputted thereinto, is constructed to generate a memory set pulse shown in FIG. 5d lagging behind the time of generation of the trigger pulse by the time constant which the motor interlocking potentiometer 411 and an external capacitor 412 determine. Also, if memory set means each consisting of an analog switch (not shown) connected in series to a motor driven potentiometer or manually operated memory set potentiometer (not shown) are independently constructed, a plurality of memory set pulses or manual set pulses are generated to make it possible to memorize a plurality of materials to be controlled. When a plurality of potentiometers are provided, it is apparent that kinds of control proportional to the number of potentiometers are possible. The comparison circuit unit V in the embodiment shown comprises an agreement circuit 54 constructed of a latch circuit 51, a rise-up differential pulse generation circuit 52, a distance decision circuit 53 and a two-input NAND gate, and is constructed to successively input thereinto the received pulse received and detected by receiver RO and the memory set pulse (which indicates a pre-memorized distance) generated by a memory set pulse generation unit IV and shown in FIG. 5d and to detect the order in which they are inputted into the comparison circuit and send forth a control signal to a drive circuit unit VI. A latch circuit 51 inputs the H-level output thereof into a J-input terminal of a distance decision circuit 53 consisting of a rise-up differential pulse generation circuit 52 and J-K F/F by the received pulse being inputted into the latch circuit 51 and inputs the L-level output thereof into a K-input terminal of the distance decision circuit 53 and reverses the output of the latch circuit as shown in FIGS. 5g and each time a trigger pulse (FIG. 5a) is inputted into the latch circuit. Accordingly, even if noise enters the receiver RO after the received pulse was inputted into the latch circuit 51, the output of the receiver RO maintains the latched state and protects the receiver against abnormal function due to the noise. The rise-up differential pulse generation circuit 52 generates an agreement detection pulse indicated in FIG. 5c and having the same width as a memory set pulse (FIG. 5d) in time of the rise-up of the H-level output of the latch circuit 51. The distance decision circuit 53 consists of J-K F/F, and inputs the output of the latch circuit 51 into a J-input terminal and a K-input terminal and also inputs a memory set pulse (FIG. 5d) into a CK-input terminal. The agreement circuit 54 consists of a two-input NAND gate for inputting the memory set pulse and the agreement detection pulse into the circuit 54, and the circuit 54, when the memory set pulse and agreement detection pulse are simultaneously inputter thereinto, inputs an L-level output shown in FIG. 5k into the R-input terminals of the respective R-S latch circuits 61, and 71 of a drive circuit unit VI and a memory set pulse control unit VII. The drive circuit unit VI consists of and R-S latch circuit 61, a distance signal generation circuit 62, and a distance drive circuit 63. The R-S latch circuit 61 is constructed in such a manner than when the circuits shown in FIG. 4 start operation, namely when the circuits shown are supplied with supply power VDD, the circuit is initially reset and the output of the circuit 61 is fixed to the L-level. The distance signal generation circuit 62 is constructed in such a manner that when a reading command switch 32 is not operated, or when the distance between the transmitter SO and the receiver RO are brought into agreement with a pre-memorized distance and the memory set pulse and the agreement detection pulse are inputted simultaneously into the agreement circuit 54, the distance signal generation circuit 62 does not permit the passage of Q and $\overline{Q}$ outputs of the distance decision circuit 53 therethrough but brings driving outputs l, m down to an L-level, and that only when a reading command switch 32 is operated, the circuit 62 inputs the Q and $\overline{Q}$ outputs of the distance decision circuit 53 into a distance drive circuit 63. The memory set pulse control circuit VII comprises an R-S latch circuit 61, a positive-negative rotation signal generation circuit 72 and a servomotor drive circuit 73. The R-S latch circuit 71 and the positive-negative rotation signal generation circuit 72 function respectively in the same manner as the R-S latch circuit 61 and the distance signal generation circuit 62. A further description of the circuits 71 and 72 are omitted to avoid duplication. The servomotor drive circuit 73 is constructed in such a manner that it receives a signal from the positive-negative rotation generation circuit 72 by operation of a memory command switch 31, rotates a servomotor 74 until a time difference between the memory set pulse and the agreement detection pulse is reduced to zero, changes the resistance value of a motor interlocking potentiometer 411 disposed in an interlocking relation with the servomotor and thereby converts the distance between the transmitter and the receiver into a transmission period of a set pulse of the set pulse generation unit IV (the time constant of the monomultivibrator) and memorizes and maintains the distance between transmitter SO and the receiver RO.

A description will now be given of how the circuits constructed as above operate by an input signal from outside and makes intended memorizing, reading and reproduction control. First, for convenience of explanation of memory operation, a description is given of the case wherein a memory set pulse is generated earlier memorized distance between the transmitter SO and the receiver RO is shorter than a distance to be afresh memorized between the two. (Refer to FIG. 5 for a chart). In this case a memory set pulse d is generated and at the same time a memory command signal e is generated from a memory command signal generation circuit 313 by operating a memory command switch 31. The memory command signal e brings the output of the R-S latch circuit 71 up to an H-level and brings Q and $\overline{Q}$ outputs of distance decision circuits 53 into a state of the outputs capable of being inputted into a servomotor drive circuit 73. The distance decision circuit 53 inputs the outputs g, h of latch circuit 51 thereinto and sends forth the Q and $\overline{Q}$ outputs of the distance decision circuit 53 at the time of rise-up of the memory set pulse. At this time, if there is no change in the state of outputs g and h of latch circuit 51 at the time of rise-up of the memory set pulse, the Q and $\overline{Q}$ outputs the distance decision circuit 53 hold the same state. Accordingly, the Q and $\overline{Q}$ outputs of distance circuit 53 pass through a positive-negative rotation signal generation circuit 72 and inputs the output shown in FIGS. 5i and 5j into a servomotor drive circuit 73. By the positive-negative rotation signals i and j the servomotor drive circuit 73 rotates a servomotor 74 in the direction of increasing the resistance value of motor interlocking potentiometer 411 and increases the time constant of set pulse d (a transmitting period of set pulse) until the memory set pulse d and agreement detection pulse c are brought into agreement. If the memory set pulse d and agreement detection pulse c are brought into agreement by this operation, an agreement pulse designated by FIG. 5k is generated from an agreement circuit 54. The agreement pulse K reverses the output of R-S latch circuit 71 to an L-level and fixes the outputs i and j of positive-negative rotation signal generation circuit 72 to the L-level and thereby stops the rotation of servomotor and completes memory operation. In this memory operation, when the memory set pulse lags in generation behind the agreement detection pulse, namely when the earlier memorized distance between the transmitter SO and receiver RO is longer than the distance to be afresh memorized, it will readily be conceived that memorized distance between the transmitter SO and receiver RO is longer than the distance to be afresh memorized, it will readily be conceived that memorizing operation is effected by rotating the servomotor in the direction of reducing the resistance value of motor interlocking potentiometer 411 on the same principle as described above. The detail of the operating principle in this case is shown in a time chart in FIG. 6. It will be understood that the distance between the first member S and the second member R is memorized in terms of the time constant of memory set pulse, namely, in terms of the resistance value of motor interlocking potentiometer 411.

A description will now be given of the reading and reproducing and control principle. For simplicity's sake, a description is given of the case wherein the earlier memorized distance between the transmitter SO and the receiver RO (Refer to FIG. 7 for a time chart). In this case, by operating a reading command signal f is generated from a reading command signal generation circuit 323. The reading command signal f bring the output of R-S latch circuit 61 up to an H-level and brings the Q and $\overline{Q}$ outputs of distance decision circuit 53 into a state of the outputs capable of being inputted into the distance drive circuit 63. Accordingly, the Q and $\overline{Q}$ outputs of the distance decision circuit 53 pass through the distance signal generation circuit 62 and input the outputs shown in FIGS. 7l and m into the distance drive circuit 63. By the distance signals shown in l and m the distance drive circuit 63 generates driving output for reducing the distance between the transmitter SO and the receiver RO until the memory set pulse d and the agreement detection pulse e are brought into agreement, an agreement pulse shown by FIG. 7k is generated from an agreement circuit 54. The agreement pulse K reverses the output of R-S latch circuit 61 to an L-level and brings the outputs of two NAND gates of distance signal generation circuit 62 to the H-level, and consequently driving is stopped by fixing the outputs l and m to the L-level to thereby complete reading and reproducing operation. In this reading operation, when the pre-memorized distance between the transmitter SO and receiver RO is longer than the present distance between the transmitter and receiver, it will readily be conceived that a driving force to increase the distance between the transmitter and receiver is produced on the same principle as described and reading and reproducing operation is effected. Reference to the time chart in FIG. 8 for the detail of the operating principle in this case will make it clear that the distance between the first member S and the second member R is reproduced and controlled to the pre-memorized distance.

It should be understood that, instead of the motor interlocking potentiometer 411 of the memory set pulse generating unit IV, the memory system of the invention makes it possible to control the capacity of capacitor 412 by bringing the capacitor 412 into interlocking relation with the servomotor.

From the description given above, the control system of memorizing and reading and reproducing a material to be controlled will have fully been understood. The invention system provides characteristic advantages in that the system enables reading and reproduction in entirely contactless manner without including any mechanically contacting member in the control circuit, that because an ultrasonic pulse very slow in transmission rate is used as a medium for measuring distance, highly accurate measurement is possible and consequently can be widely used in the control of distance between the first and second members which can make not only relatively linear movement but also whose movement can be converted into linear movement, that the relative position between two members can successively be controlled to a desired position, that, because a resistance value for determining the time constant of a memory set pulse is used as a medium for memorizing distance, breaking the supply power for control circuit can still hold memory contents, and that change by effect of years is small.

Figure 9:
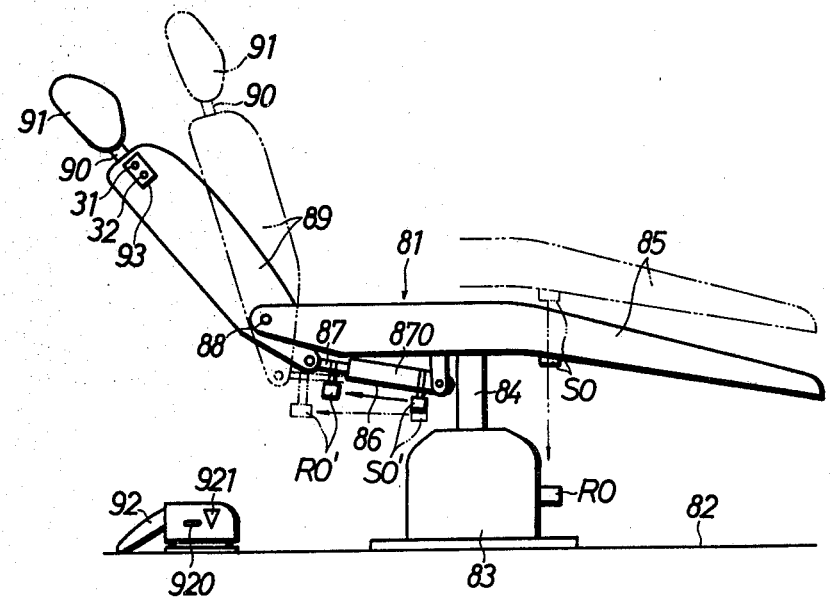
FIG. 9 is a front view of one embodiment of a dental treatment chair including the device of the invention.
Figure 10:
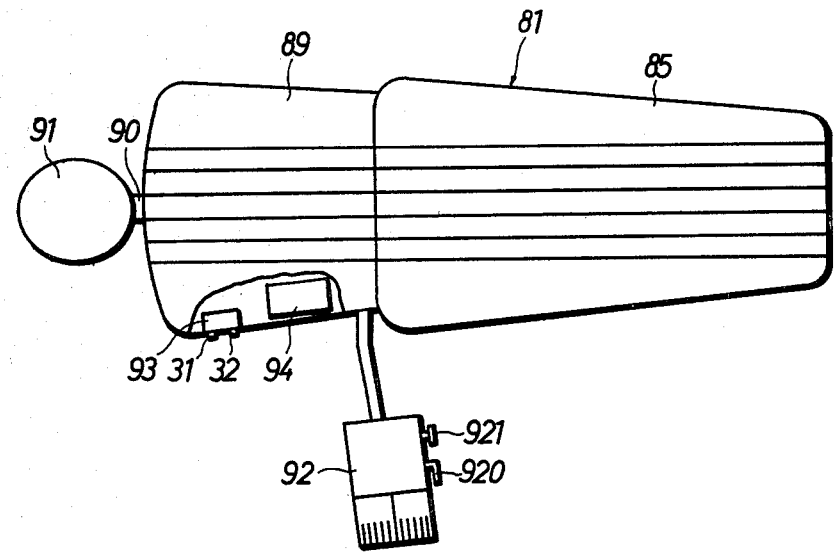
FIG. 10 is a plan view of the embodiment of FIG. 9.

Next, in a stool or a chair in which the control device for preproduction utilizing the control system of memory and reading and reproduction is utilized in a dental and other medical treatment chairs, barber's or beauty specialist's chair, a description will now be given of a device for automatically and electrically controlling elevation and tilting of a first member (for example, base) and a second member (for example, a seat, backrest, headrest, etc.), which are in an opposed distance varying relation by their relative linear movement, by use of an ultrasonic pulse as a position detecting medium, with reference to a dental treatment chair. FIGS. 9 and 10 are a front view and a plan view, broken in part, showing one embodiment of a dental treatment chair including the device of the invention. Referring to the known structure of the treatment chair shown and to the problems thereof, a treatment chair 81 includes a base 83 resting on the floor 82, a seat 85 adapted to be elevated while being maintained substantially horizontally by a cylinder shaft 84 of a hydraulic elevation mechanism (not shown) incorporated into the base 83, a backrest 89 capable of tilting back and forth around a rotating shaft 88 with respect to the chair 85 by expansion and contraction of a cylinder shaft 87 of a hydraulic tilting mechanism 86, and a headrest 91 capable of similarly tilting back and forth with respect to the backrest 89 through an arm 90. Elevation of the seat 85 and tilting of the backrest 89 are artificially carried out by operation of an elevation pedal 920 and a tilting pedal 921 of a foot pedalling device 92 disposed in the floor 82. Stated differently, the seat 85 becomes a second member which can change its opposed distance through linear movement (elevational movement) with respect to the base 83 which is a first member, while tilting of the backrest 89 with respect to the seat 85 is substituted by linear expansion and contraction movement of a cylinder shaft 87 of the hydraulic tilting mechanism 86. In this case, when a fixed portion 870 of the hydraulic tilting mechanism 86 is used as a first member, the cylinder shaft 87 becomes a second member which changes its opposed position with respect to the first member by linear movement so as to artificially control the distance between the first and second members. By the way, when a multiplicity of patients are treated successively, it becomes a great burden of labor to a doctor or his assistant for him to decide a chair position agreeable to various positions fit for treatment in consideration of a bodily difference between individuals by the foot pedalling operation alone. Thus, in the invention, the desired positioning of a chair is effected by foot pedalling operation, and the position of the chair is memorized by single operation of a memory command switch and the position of the chair is reproduced and controlled to the desired position by operation of a read command switch as occasion demands.

Referring now in detail to the device of the invention, the reference character SO in FIGS. 9 and 10 designates an ultrasonic pulse transmitter mounted on the underside of a chair 85 and RO designates an ultrasonic pulse receiver fixed to a base 83 in an opposed relation with the transmitter SO on a straight line preferably with the respective principal axes brought substantially into agreement with each other. These transmitter SO and receiver RO are intended to control the position of the seat 85. Similarly, the characters SO' and RO' designate respectively an ultrasonic pulse transmitter and an ultrasonic pulse receiver for use in the control of tilting position of a backrest 89 and are disposed in the same opposed relation with a stationary portion 870 and a cylinder shaft 87 of the hydraulic tilting mechanism 86. The numeral 94 designates a control box having its main body portion incorporated into the backrest 89 as shown in FIG. 10. In the box 94 are contained both for elevation of seat and for tilting of backrest an ultrasonic pulse generation unit I (except transmitter SO) and a received pulse generation unit II (except receiver RO) described in detail in conjunction with the previously described control system of memory and reading and production, a control command circuit unit III (except a memory command switch 31 and a read command switch 32), a memory set pulse generation unit IV, a comparison circuit unit V, a drive circuit unit VI, and a memory set pulse control unit VII. The numeral 93 designates a command switch box which has its main body portion incorporated into the backrest 89 in the same manner as the box 94; 31 a memory command switch; and 32 designates a read command switch. These switches are constructed to give command signals simultaneously to the control command circuit III for seat elevation and for backrest tilting. For elevation of seat 85 and tilting of backrest 89 is used as stated a hydraulic mechanism as a direct operating instrument and control of the mechanism is made by operating a foot pedalling device 92 and the read command switch 32. The output terminal for foot pedalling and the output terminal for automatic control by command switch are connected in series. It is to be understood that control can be made by use of any of the systems. How the dental treatment chair constructed as above is operated by a signal from outside and the intended memory, reading and reproduction is effected is described in detail in the above control system of memory, reading and reproduction, and hence a further description of the same is omitted. And how to use the dental chair will briefly be described. First, the positions of chair 85 and backrest 89 are set to desired positions by operating elevation pedal 920 and tilting pedal 921 of foot pedalling device 92. When it is desired to memorize the positions, it is only necessary to operate a memory command switch 31. The distance between the transmitter SO' and the receiver RO' are fixedly memorized in terms of the time constant of memory set pulse for elevation and tilting purposes, namely in terms of a resistance value of a motor interlocking potentiometer on the described operating principle. When it is desired to reproduce the respective positions of seat 85 and backrest 89 memorized by the above operation as occasion demands, all that is necessary to do is to operate a read command switch 32. Reading and reproduction is carried out on the described operating principle by thus operating the read command switch 32. The once memorized contents are not charged as long as the memory command switch 31 is not re-operated even if the positions of seat 85 and backrest 89 are changed.

The description above has been given of the device of the invention with reference to the dental treatment chair illustrated by way of example, but the invention can find application to various other scopes of use without being limited to the embodiment shown. For example, installation of the transmitter and receiver in an opposed relation at relatively short distances from each other at suitable portions of a medical treatment table (including an operating table) in addition to the dental chair, barber's chair beauty specialist's chair, and other conveying and elevation devices (to be referred to hereinafter as "treatment chair or stool") provides advantageous application of the invention to position control of the moving elements of the treatment chair and stool. Also, in conjunction with the structure of the above embodiment, any optional change may be introduced in relative relation and position of the transmitter with the receiver and in the set positions of the command switches, control boxes, etc.

As described, the invention provides immense advantages such as that automatic control is possible without any mechanically contacting member contained in the control device but in an entirely contactless manner, that very accurate measurement is possible at a relatively short distance because an ultrasonic pulse far slower in transmission rate than an electric signal and relatively small in pulse width and small in directivity is used as a medium for measurement and control of position; that the invention is widely applicable to control of the distance between the first and second members not only when they are in a relatively linearly movable relation with each other, but also when their movement is convertible into linear movement; that position control is possible without introducing a change in the structure of the stools or chairs in conventional use; that a desired position is reproduced and controlled as occasion demands; that because a resistance value determining the time constant of memory set pulse is used in memorizing a desired distance, the control circuit still holds the contents of memory even if the supply power of the control circuit is broken; and that change effect of years is small.

We claim:

1. A control method of memorizing and reading and producing the position of a material to be controlled, said method being a system of memorizing the distance between a first member and a second member which are in a relative distance variable relation on a straight line and reading and reproducing the same in response to command, said system further comprising (a) arranging an ultrasonic transmitter and an ultrasonic receiver in an opposed relation with each other on a straight line so as to interlock with the linear movement of said two members; (b) exciting said transmitter in a periodically timed relation to thereby send forth an ultrasonic pulse and receiving pulse by said receiver; (c) detecting the received pulse by an electrical means and sending forth the received pulse; (d) generating a memory set pulse lagging in time and different from said received pulse in synchronism with said sending forth of ultrasonic pulse from said transmitter; (e) generating a decision signal by comparing said received pulse with said memory set pulse and determining a time difference between the two; (f) changing said time lag of the memory set pulse until said received pulse and said memory set pulse are brought into agreement in accordance with said decision signal and memorizing the distance between said two members in terms of time lag of memory pulse; and (g) reading the distance between the two members until the received pulse and the memory set pulse are brought into agreement and reproducing the distance in the memorized position by reading the distance between said two members memorized by steps (a) to (f), comparing the received signal with the memory set pulse in accordance with a command signal, determining a time difference between the two and generating a decision signal.

2. A control device including an ultrasonic transmitter and an ultrasonic receiver coupled between a first member and a second member which are disposed in an opposed distance variable relation by a relatively linear movement, and an ultrasonic pulse generation unit for exciting said receiver in a periodically time relation, a received pulse generation unit for generating a received pulse on the basis of the ultrasonic pulse received by said receiver, a memory set pulse generation unit for generating a memory set pulse separate from said received pulse and lagging in time behind the received pulse in synchronism with the sending forth of ultrasonic pulse from said transmitter, a comparison circuit unit for comparing the memory set pulse with said received pulse and determining a time difference between the two, a memory set pulse control unit for changing the time lag of the memory set pulse by the signal from said comparison circuit unit until said received pulse and said memory set pulse are brought into agreement and memorizing the distance between said two members in terms of the time lag of the memory set pulse, a control command circuit unit for giving a command signal to said memory set control unit, a drive circuit unit for supplying operating output for controlling the difference between said two members by the control command circuit unit, and said command circuit unit for giving the command signal to said drive circuit unit, said device further being constructed to read either one or both positions of said first and second members and reproduce the same in the memorized position or positions thereof by operating said control command unit through said drive circuit unit.

3. A device according to claim 2, wherein said first member is a base for a chair or a stool for use with dentists, physicians, barbers, beauty specialists and the like, said second member is a seat elevatable with respect to said base by an elevation mechanism, and said transmitter and receiver are coupled between said base and said seat.

4. A device according to claim 2, wherein said first member is a seat of a chair or a stool for use with dentists, physicians, barbers, beauty specialists and the like, said second member is a backrest tiltable with respect to said seat by a tilting mechanism, said transmitter and said receiver are mounted indirectly with respect to said first and second members between an expansible portion and a fixed portion of the tilting mechanism for tilting the backrest.

5. A device according to claim 2, wherein said first and second members are provided in at least one set.

6. A device according to claim 5 wherein said first member is a base for a stool or a chair for use with dentist, physicians, barbers, beauty specialists and the like, said second member is a seat elevatable with respect to said base by a tilting mechanism, said transmitter and said receiver are mounted directly between said base and said seat, another first member is a seat of a chair or a stool for use with dentists, physicians, barbers, beauty specialists and the like, another second member is a backrest tiltable with respect to said base by a tilting mechanism, said transmitter and said receiver are indirectly mounted with respect to said first and second members between an expansible portion and a fixed portion of the tilting mechanism for tilting said backrest.

7. A device according to claim 6, wherein the expansibly moving distance of the moving mechanisms of the transmitter and the receiver disposed between said base and said seat is equal to that between said base and said seat, and the expansibly moving distance of the moving mechanisms of the transmitter and the receiver disposed between the expansibly moving portion and the fixed portion of the tilting mechanism maintains a specified relation with an angle of inclination which said backrest makes with the seat.

8. A device according to claim 2, wherein said first member is a base for a chair or a stool for use with dentists, physicians, barbers, beauty specialists and the like, and said second member is a seat tiltable with respect to said base by said tilting mechanism.

* * * * *